US006606686B1

(12) United States Patent
Agarwala et al.

(10) Patent No.: US 6,606,686 B1
(45) Date of Patent: Aug. 12, 2003

(54) UNIFIED MEMORY SYSTEM ARCHITECTURE INCLUDING CACHE AND DIRECTLY ADDRESSABLE STATIC RANDOM ACCESS MEMORY

(75) Inventors: Sanjive Agarwala, Richardson, TX (US); Charles L. Fuoco, Allen, TX (US); David A. Comisky, Plano, TX (US); Timothy D. Anderson, Dallas, TX (US); Christopher L. Mobley, Coppell, TX (US)

(73) Assignee: Texas Instruments Incorporated, Dallas, TX (US)

( * ) Notice: Subject to any disclaimer, the term of this patent is extended or adjusted under 35 U.S.C. 154(b) by 210 days.

(21) Appl. No.: 09/603,645

(22) Filed: Jun. 26, 2000

Related U.S. Application Data

(60) Provisional application No. 60/166,534, filed on Nov. 18, 1999, and provisional application No. 60/144,550, filed on Jul. 15, 1999.

(51) Int. Cl.[7] .............................................. G06F 12/00
(52) U.S. Cl. ........................ 711/129; 711/122; 711/146; 711/170; 711/173
(58) Field of Search ................................ 711/122, 129, 711/146, 170, 173

(56) References Cited

U.S. PATENT DOCUMENTS

| | | | | |
|---|---|---|---|---|
| 5,014,195 A | * | 5/1991 | Farrell et al. ........... | 365/230.01 |
| 5,067,078 A | * | 11/1991 | Talgam et al. ......... | 365/230.01 |
| 5,226,009 A | * | 7/1993 | Arimoto ................. | 365/189.04 |
| 5,339,268 A | * | 8/1994 | Machida ....................... | 365/49 |
| 5,383,146 A | * | 1/1995 | Threewitt ..................... | 365/49 |
| 5,410,669 A | * | 4/1995 | Biggs et al. ................. | 711/118 |
| 5,687,131 A | * | 11/1997 | Spaderna ............... | 365/189.07 |
| 5,721,874 A | * | 2/1998 | Carnevale et al. .......... | 711/171 |
| 5,797,026 A | * | 8/1998 | Rhodehamel et al. ....... | 711/146 |
| 5,895,495 A | * | 4/1999 | Arimilli et al. ............. | 711/122 |
| 6,122,715 A | * | 9/2000 | Palanca et al. ............. | 711/154 |
| 6,188,596 B1 | * | 2/2001 | Holst .................... | 365/230.03 |

FOREIGN PATENT DOCUMENTS

EP 0 797 148 A1 * 9/1997

* cited by examiner

*Primary Examiner*—Reba I. Elmore
(74) *Attorney, Agent, or Firm*—Robert D. Marshall, Jr.; W. James Brady, III; Frederick J. Telecky, Jr.

(57) ABSTRACT

A data processing apparatus includes a central processing unit and a memory configurable as cache memory and directly addressable memory. The memory is selectively configurable as cache memory and directly addressable memory by configuring a selected number of ways as directly addressable memory and configuring remaining ways as cache memory. Control logic inhibits indication that tag bits matches address bits and that a cache entry is the least recently used for cache eviction if the corresponding way is configured as directly addressable memory. In an alternative embodiment, the memory is selectively configurable as cache memory and directly addressable memory by configuring a selected number of sets equal to $2^M$, where M is an integer, as cache memory and configuring remaining sets as directly addressable memory.

20 Claims, 7 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

UNIFIED MEMORY SYSTEM ARCHITECTURE INCLUDING CACHE AND DIRECTLY ADDRESSABLE STATIC RANDOM ACCESS MEMORY

This application claims priority under 35 USC §119(e)(1) of Provisional Application No. 60/144,550, filed Jul. 15, 1999 and Provisional Application No. 60/166,534, filed Nov. 18, 1999.

CROSS REFERENCE TO RELATED APPLICATIONS

This application is related to the following co-pending applications:

U.S. Pat. No. 6,484,237 entitled UNIFIED MULTI-LEVEL MEMORY SYSTEM ARCHITECTURE WHICH SUPPORTS BOTH CACHE AND ADDRESSABLE SRAM filed Jun. 26, 2000, which claims priority from U.S. Provisional Application No. 60/166,538 filed Nov. 18, 1999 and U.S. Provisional Application No. 60/144,550 filed Jul. 15, 1999;

U.S. Pat. No. 6,446,241 entitled AN AUTOMATED METHOD FOR TESTING CACHE issued September 3, 2002;

U.S. patent application Ser. No. 09/603,057 entitled METHOD AND APPARATUS FOR OPERATING ONE OR MORE CACHES IN CONJUNCTION WITH DIRECT MEMORY ACCESS CONTROLLER filed Jun. 26, 2000, which claims priority from U.S. Provisional Application No. 60/144,569 filed Jul. 15, 1999;

U.S. Pat. No. 6,535,958 entitled MULTILEVEL CACHE SYSTEM COHERENCE WITH MEMORY SELECTIVELY CONFIGURED AS CACHE OR DIRECT ACCESS MEMORY AND DIRECT MEMORY ACCESS filed Jun. 26, 2000, which claims priority from U.S. Provisional Application No. 60/166,527 filed Nov. 18, 1999 and U.S. Provisional Application No. 60/144,550 filed Jul. 15, 1999;

U.S. patent application Ser. No. 09/603,333 entitled PROGRAMMER INITIATED CACHE BLOCK OPERATIONS filed Jun. 26, 2000, which claims priority from U.S. Provisional Application No. 60/166,535 filed Nov. 18, 1999 and U.S. Provisional Application No. 60/144,550 filed Jul. 15, 1999; and U.S. Pat. No. 6,408,345 entitled SUPERSCALAR MEMORY TRANSFER CONTROLLER IN MULTI-LEVEL MEMORY ORGANIZATION issued Jun. 18, 2002.

TECHNICAL FIELD OF THE INVENTION

The technical field of this invention is data processing systems and particularly data processing systems with combined cache memory and random memory access memory.

BACKGROUND OF THE INVENTION

Data processing systems typically employ data caches or instruction caches to improve performance. A small amount of high speed memory is used as the cache. This cache memory is filled from main memory on an as needed basis. When the data processor requires data or an instruction, this is first sought from the cache memory. If the data or instruction sought is already stored in the cache memory, it is recalled faster than it could have been recalled from main memory. If the data or instruction sought is not stored in the cache memory, it is recalled from main memory for use and also stored in the corresponding cache. A performance improvement is achieved using cache memory based upon the principle of locality of reference. It is likely that the data or the instruction just sought by the data processor will be needed again in the near future. Use of cache memories speeds the accesses needed to service these future needs. A typical high performance data processor will include instruction cache, data cache or both on the same integrated circuit as the data processor core.

Cache memories are widely used in general purpose microprocessors employed in desktop personal computers and workstations. Cache memories are frequently used in microprocessors employed in embedded applications in which the programmable nature of the microprocessor controller is invisible to the user. Caching provides a hardware managed, programmer transparent access to a large memory space via a physically small static random access memory (SRAM) with an average memory access time approaching the access time of the SRAM. The hardware managed and programmer transparent aspect of cache systems enables better performance while freeing the programmer from explicit memory management.

Cache memories are typically not used with digital signal processors. Digital signal processors are generally used in applications with real time constraints. Such real time constraints typically do not operate well with cache memories. When employing cache memories the access time for a particular instruction or data cannot be predetermined. If the sought item is stored in the cache, then the access time is a known short time. However, if the item sought is not stored in the cache, then the access time will be very much longer. Additionally, other demands for main memory access will make the access time from main memory vary greatly. This variation in memory access time makes planning for real time applications extremely difficult or impossible.

Digital signal processors will more typically include some directly addressable SRAM on the same integrated circuit as the data processor core. The programmer must manage transfer of critically needed instructions and data to the on-chip SRAM. Often this memory management employs a direct memory access unit. A direct memory access unit typically controls data moves between memories or between a memory and a peripheral ordered by the data processor core. Once begun on a particular data transfer the direct memory access unit operates autonomously from the data processor core. Once stored in the on-chip SRAM, these items are available to the data processor core at a greatly lowered access time. Thus these items will be available to service the real time constraints of the application. Note that both the data processor core and the direct memory access unit may access the on-chip SRAM. The memory management task is difficult to program. The programmer must anticipate the needs of the application for instructions and data and assure that these items are loaded into the on-chip SRAM ahead of their need. Additionally, the programmer must juggle conflicting needs for the typically limited space of the on-chip SRAM. While this is a difficult programming task, it is generally preferable to the unknown memory latencies of cache systems in real time applications.

Digital signal processor architectures are becoming more complex. The complexity of new applications have increased and their real time constraints have become more stringent. These advances have made the programming problem of real time memory management using on-chip SRAM increasingly difficult. This has slowed applications development. With variety in the size of on-chip SRAM and the variations in external memory latency, these programs have increasingly been limited to specific product configurations. Thus it has not been possible to employ the same set of instructions to solve a similar memory management problem in a similar product. This need for custom algorithms for each product prevents re-use of instruction blocks and further slows product development. The increasing architectural capabilities of processors also require bigger on-chip memories (either cache or SRAM) to prevent processor stalls. Processor frequencies are increasing. This increasing memory size and processor frequency works against easy scaling of the on-chip memory with increasing data processing requirements.

There is a need in the art for a memory management solution that includes the best of both cache systems and programmer managed on-chip SRAM. This new memory management solution would preferably enable programmer selection of more cache system benefits or more on-chip SRAM benefits.

SUMMARY OF THE INVENTION

A data processing apparatus includes a central processing unit and a memory configurable as cache memory and directly addressable memory. The memory is configured as a predetermined number of cache entries organized in a predetermined number of sets and a predetermined number of ways. In the preferred embodiment the memory is selectively configurable as cache memory and directly addressable memory by configuring a selected number of ways as directly addressable memory and configuring remaining ways as cache memory. Control logic inhibits indication that tag bits matches a predetermined number of address bits if said corresponding way is configured as directly addressable memory. Control logic inhibits indication that a cache entry is the least recently used for cache eviction if the corresponding way is configured as directly addressable memory. A bank select circuit enables one cache entry within a set matching an address to be accessed dependent upon at least one address bit and the ways configured as directly addressable memory.

In an alternative embodiment, the memory is selectively configurable as cache memory and directly addressable memory by configuring a selected number of sets equal to $2^M$, where M is an integer, as cache memory and configuring remaining sets as directly addressable memory.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
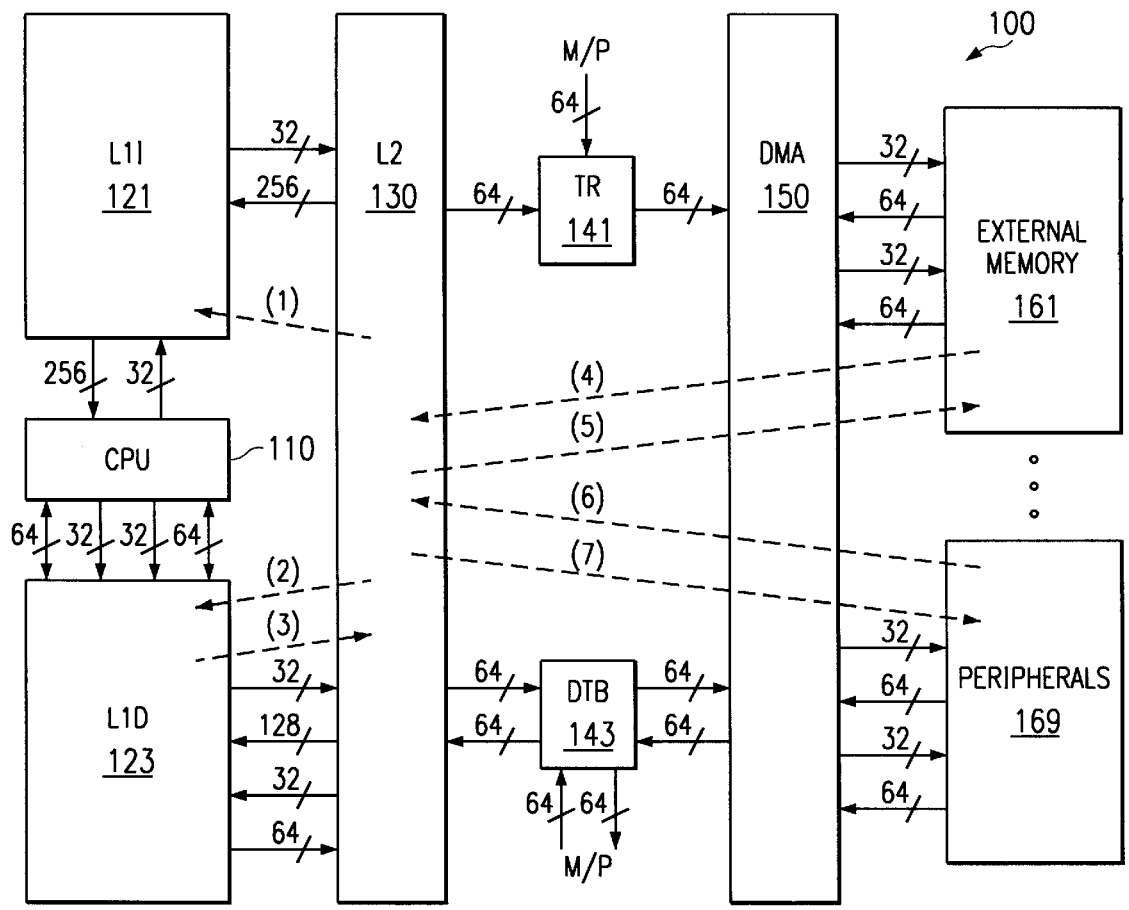
FIG. 1 illustrates the organization of a typical digital signal processor to which this invention is applicable.

FIG. 1 illustrates the organization of a typical digital signal processor system 100 to which this invention is applicable. Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 8, 9A and 9B.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

In accordance with the preferred embodiment of this invention, level two unified cache 130 may be configured to include variable amounts of static random access memory (SRAM) instead of cache memory. In accordance with this invention some or all of level two unified cache 130 may be configured as normal read/write memory which operates under program control. If some of level two unified cache 130 is configured as SRAM, then this memory space may be either a source or a destination of a direct memory access. This will be more fully described below.

The complex interrelation of parts of digital signal processor system 100 permits numerous data movements. These are illustrated schematically in FIG. 1 and will be listed here. First, level one instruction cache 121 may receive instructions recalled from level two unified cache 130 (1) for a cache miss fill. In this example, there is no hardware support for self-modifying code so that instructions stored in level one instruction cache 121 are not altered. There are two possible data movements between level one data cache 123 and level two unified cache 130. The first of these data movements is a cache miss fill from level two unified cache 130 to level one data cache 123 (2). Data may also pass from level one data cache 123 to level two unified cache 130 (3). This data movement takes place upon; a write miss to level one data cache 123 which must be serviced by level two unified cache 130; a victim eviction from level one data cache 123 to level two unified cache 130; and a snoop response from level one data cache 123 to level two unified cache 130. Data can be moved between level two unified cache 130 and external memory 160. This can take place upon: a cache miss to level two unified cache 130 service from external memory (4) or a direct memory access 150 data movement from external memory 161 and level two unified cache 130 configured as SRAM; a victim eviction from level two unified cache 130 to external memory 161 (5) or a direct memory access 150 data movement from a portion of level two unified cache 130 configured as SRAM to external memory 161. Finally, data can move between level two unified cache 130 and peripherals 169. These movements take place upon: or a direct memory access 150 data movement from peripheral 169 and level two unified cache 130 configured as SRAM; or a direct memory access 150 data movement from a portion of level two unified cache 130 configured as SRAM to peripherals 169. All data movement between level two unified cache 130 and external memory 161 and between level two unified cache 130 and peripherals 169 employ data transfer bus 143 and are controlled by direct memory access unit 150. These direct memory access data movements may take place as result of a command from central processing unit core 110 or a command from another digital signal processor system received via transfer request bus 141.

Figure 2:
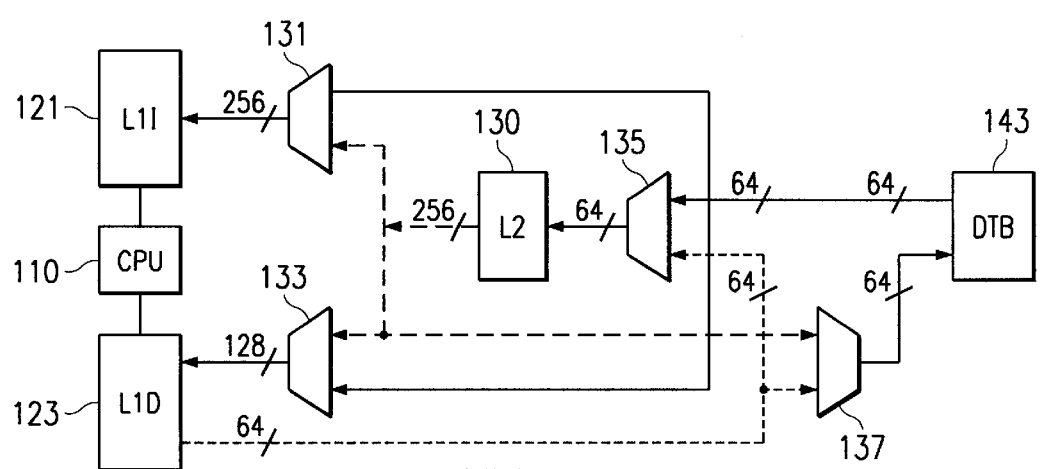
FIG. 2 illustrates the data paths to and from the level two unified cache illustrated in FIG. 1.

FIG. 2 illustrates the data connections among parts of digital signal processing system 100 illustrated in FIG. 1. FIG. 2 illustrates the data path widths between the various parts. The level one instruction cache interface includes a 256-bit data path from level two unified cache 130 to level one instruction cache 121. This data path size corresponds to one half of the 64 byte cache line size within level one instruction cache 121 and equals one instruction fetch packet. In the preferred embodiment, the 256-bits are 64 bits from each of the four banks of level two unified cache 130. Thus level two unified cache 130 can source this amount of data in a single cycle. This occurs regardless of the amount of level two unified cache 130 configured as cache. The cache/SRAM partitioning within level two unified cache 130 is across the data banks rather than within the data banks. Thus level two unified cache 130 can always supply 256 bits to level one instruction cache 121 if any part is partitioned as cache. Level one instruction cache 121 may also receive data directly from data transfer bus 143, for example upon fetching code from non-cacheable memory addresses. Data transfer bus 143 supplies only 64 bits per cycle, thus at least four cycles are needed to accumulate the 256 bits. The data source for transfers to level one instruction cache 121 is selected by multiplexer 131. FIG. 1 illustrates supply of 32 address bits from level one instruction cache 121 to level two unified cache 130. Because level one instruction cache 121 operates on 256 bit boundaries, the 8 least significant bits are always zero and may be omitted from the address. Note that writes to level one instruction cache 121 are not permitted, therefore level one instruction cache 121 never supplies data to level two unified cache 130.

The level one data cache interface includes a 128-bit data path from level two unified cache 130 to level one data cache 123. In the preferred embodiment, the 128 bits are 64 bits from each of two banks of level two unified cache 130. This assumes no bank conflicts with other data transfers. Level two unified cache 130 only services one cache fill data transfer to level one data cache 123 per cycle. Thus if two load/store units in central processing unit 110 each request data and produce a read cache miss within level one data cache 123, the two read miss requests to level two unified cache 130 are serviced in sequence. As noted above, the cache/SRAM partitioning of level two unified cache 130 is across the memory banks. Thus level two unified cache 130 can supply data to level one data cache 123 from two banks so long as level two unified cache 130 is partitioned to include some cache. Level one data cache 123 may also receive data directly from data transfer bus 143, for example upon fetching data from non-cacheable memory addresses. Data transfer bus 143 supplies only 64 bits per cycle, however accesses to non-cacheable memory addresses are at most 32 bits. In this case, the 32 bits are transferred in a single data transfer cycle. The data source for transfers to level one data cache 123 is selected by multiplexer 133. FIG. 1 illustrates supply of two sets of 32 address bits from level one data cache 123 to level two unified cache 130. Because level one data cache 123 operates on 64 bit boundaries, the 6 least significant bits are always zero and may be omitted from the address.

Level one data cache 123 may supply data to level two unified cache 130. This occurs on a write miss, a cache entry eviction and a response to a snoop hit to data in the modified state within level one data cache 123. It is possible that each of the load/store units within central processing unit 110 would require data transfer from level one data cache 123 to level two unified cache 130 in the same cycle. Upon a write miss within level one data cache 123, only the 32 bits of the write data is supplied from level one data cache 123 to level 2 unified cache 130. For either a cache eviction or a snoop data response, level one data cache 121 supplies 128 bits to level two unified cache 130, the same data width as opposite transfers. Data from level one data cache 123 may also be supplied to data transfer bus 143 as selected by multiplexer 137. This could occur as a result of a write to a non-cacheable address.

The interface between level two unified cache 130 and data transfer bus 143 includes two 64-bit data busses. A first of these data busses supplies data from data transfer bus 143 to level two unified cache 130. This data may be stored in level two unified cache 130 via a single 64-bit write port as selected by multiplexer 135. The second bus is a 64-bit bus supplying data from level two unified cache 130 or level one data cache 123 as selected by multiplexer 137. All transfers using data transfer bus 143 employ direct memory access unit 150 responsive to commands via transfer request bus 141.

Figure 3:
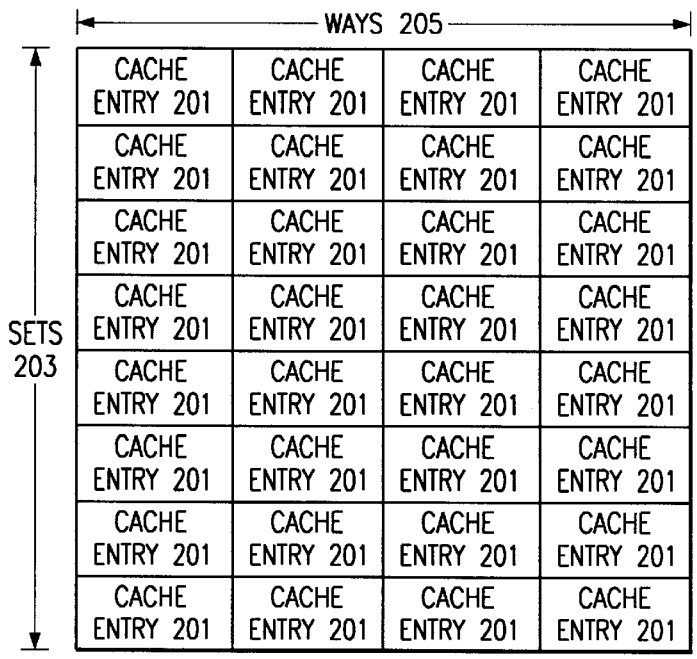
FIG. 3 illustrates the organization of a typical cache memory.

FIG. 3 illustrates the organization of a typical cache memory. Level two unified cache 130 includes a plurality of cache entries 201. These cache entries are sometimes called cache lines. Each cache entry 201 stores a data of a fixed size. The fixed size is a design choice. This fixed size of a cache entry 201 typically includes more than the minimum addressable data size of the data processing system. This factor of the minimum addressable data size is an integral power of 2 for reasons that will be explained below. It is known in the art to select a cache entry data size equal to the external data bus size, which may differ from and is typically greater than the minimum addressable data size. The cache entry data size may also be selected some size larger than the external data bus size due to the capability of providing wider data busses internal to an integrated circuit embodying the data processing system than is feasible for external connections. As an example only, it is typical for a data processing system to address individual bytes (8 bits) within memory while cache entries may each include 8 to 128 bytes.

The cache entries 201 are organized in a plurality of sets 203 and a plurality of ways 205 in a manner known in the art. It is known in the art to construct a cache memory in a manner that not all cache entries may store data from all memory addresses. Plural memory locations alias into each set. The particular set within sets 203 serves as a proxy for some bits of the address. Thus the number of sets must be an integral power of 2. The address bits selected are typically the next most significant bits beyond the cache entry size. These bits are selected to distribute adjacent or nearby and presumably locally referenced data sets across the sets 203. FIG. 3 illustrates eight sets 203. This is an example for illustrative purposes only. Level two unified cache 130 preferable includes 128 such sets. Known cache systems may have more or fewer sets. The data position within each cache entry 201 serves as a proxy for the least significant bits of the address. For example, in a cache entry having data sixty-four times the minimum addressable data size, the cache entry location serves as proxy for the six least significant address bits. Thus the number of minimum data size blocks within each cache entry 201 must be an integral power of 2.

It is known in the art to provide more than one cache entry for each set. The number of such cache entries is known as the ways of the cache. The number of ways is also known as the set associativity of the cache. FIG. 3 illustrates a cache memory organized into 4 ways 205. Those skilled in the art would realize that this is merely a convenient example. Known cache systems may include more or fewer ways. The size of the cache entries and the number of sets of the cache determines the number of tag bits that must be provided for each cache entry. The position within each cache entry serves as a proxy for a number of least significant bits of the address. The particular set serves as proxy for a number of address bits next more significant than the position within the cache entry. A set of tag bits must be stored in a read/write memory for each cache entry to completely specify the memory address cached. If the total number of address bits is M, the number of sets is $2^s$ and each cache entry holds $2^c$ blocks of the minimum data size, then the number of tag bits for each cache entry is M-S-C. In the preferred embodiment the address has 32 bits which point to individual data bytes. Level two unified cache 130 has cache entries of 128 bytes, thus C is 7. Level two unified cache 130 includes 128 sets, thus S is also 7. Accordingly, each cache entry must have 18 tag bits. Note that the minimum addressable data size and the minimum data transfer size are not necessarily the same. It is known to address memory in bytes but transfer data in words of 32 bits (4 bytes).

Provision of plural ways within the cache permits caching more than one memory address that aliases into the same set. This is considered advantageous up to a point. It is generally believed that a cache with 8 ways operates nearly as well as a cache where any memory address may be cached within any cache entry. The use of cache ways reduces the problem of tracking the least recently used cache entry for replacement. Data located at a particular main memory address may be stored only in the corresponding cache set. Upon a cache miss requiring victim eviction, the victim must be from the same set as the set which may store the missed address. Thus the least recently used information need only be kept relative to the other ways within each set. Since practical caches rarely have more than 4 or 8 ways, no more than two or three bits are required per cache entry to track the least recently used cache entry. The use of sets as a proxy for next more significant address bits greatly reduces the number of address comparisons with variable data needed to determine a cache hit and identify where the sought data is stored upon a cache hit.

Figure 4:
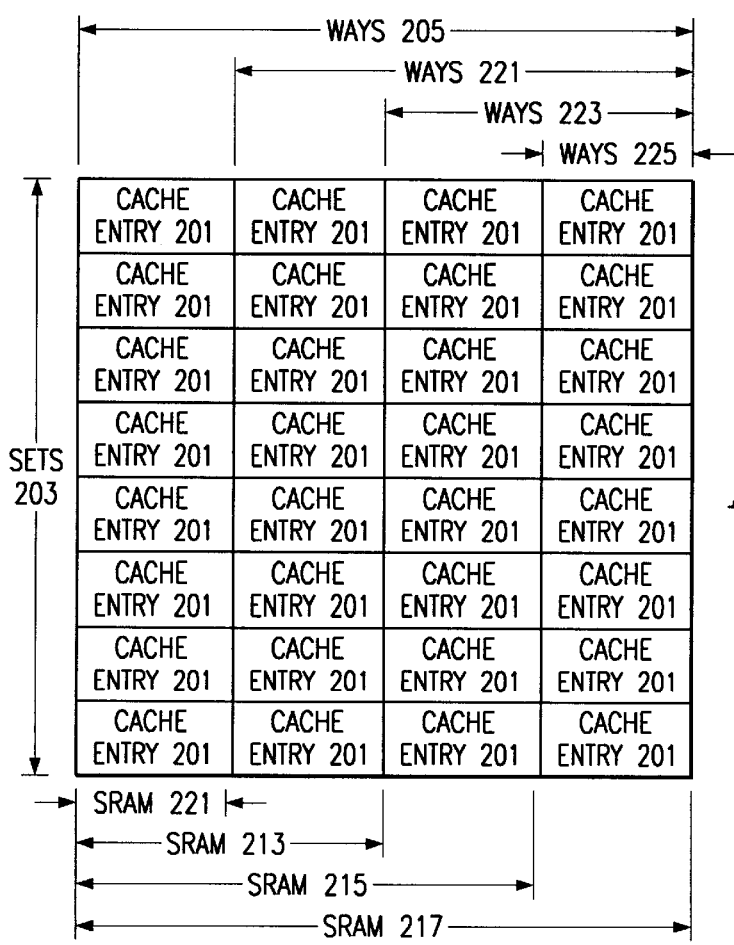
FIG. 4 illustrates a first manner of selectively dividing a memory between cache memory and directly addressable random access memory.

FIG. 4 illustrates a manner of selectively configuring level two unified cache 130 as cache or as directly addressable SRAM. As shown in FIG. 4, each way of cache system 200 may be selected as cache memory or as directly addressable static random access memory (SRAM). Configuring a way of cache system 200 as SRAM correspondingly reduces the ways of the cache memory. If the number of ways of the cache system is N, then the cache system may be configured with any integer from 0 to N SRAM partitions. If the number of SRAM partitions is M, with $0 \leq M \leq N$, then the configured cache system has N-M ways. In the example illustrated in FIG. 4, the cache memory system has 4 ways. The cache memory system may be partitioned with 0, 1, 2, 3 or 4 of the ways as SRAM. The effective ways of associativity of the cache is reduced for each partition selected as SRAM. Table 1 shows the available options for the 4-way set-associative example illustrated in FIG. 4.

TABLE 1

| SRAM Partitions | Cache Partitions | Cache Associativity |
| --- | --- | --- |
| 0 | 4 | 4-way |
| 1 | 3 | 3-way |
| 2 | 2 | 2-way |
| 3 | 1 | direct mapped |
| 4 | 0 | — |

Thus: if 0 partitions are configured as SRAM, then there are 4 cache ways 205; if 1 partition 211 is configured as SRAM, then there are three cache ways 221; if 2 partitions 213 are configured as SRAM, then there are two cache ways 223; if three partitions 215 are configured as SRAM, then there is one way 225 (also known as direct mapped because each memory address may be stored in only one cache entry); and if 4 partitions 217 are configured as SRAM, then there is no cache memory. In the preferred embodiment, the ways may only be configured as SRAM only in a predetermined order enabling the SRAM memory addresses to be contiguous whatever number of partitions are configured as SRAM. Note that the location within a cache entry still serves as proxy for the least significant memory address bits. The portion of level two unified cache 130 configured as SRAM thus becomes a directly addressable memory having a greater data width than the minimum addressable data size.

Figure 5:
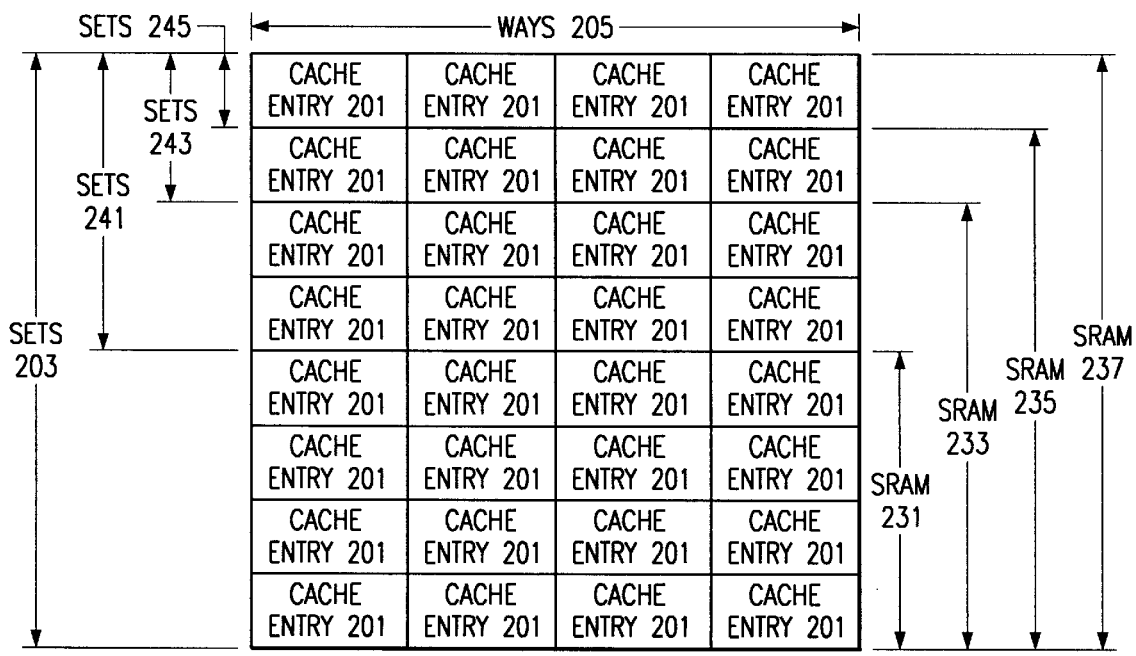
FIG. 5 illustrates a second manner of selectively dividing a memory between cache memory and directly addressable random access memory.

FIG. 5 illustrates an alternative manner of selectively configuring level two unified cache 130 as cache or as directly addressable SRAM. As shown in FIG. 5, the number of sets devoted to cache varies with the amount of SRAM allocated. Because the number of sets must be an integral power of 2, this technique implies a different set of relative sizes than the prior embodiment. If the number of sets is S, then the permitted cache sizes are $S/2^N$, where N goes from 0 to S. In the example illustrated in FIG. 5 there are 8 sets. Table 2 shows the available options in this example.

TABLE 2

| SRAM Relative Size | Cache Relative Size | Cache Associativity |
| --- | --- | --- |
| 0 | 1 | 4-way |
| 1/2 | 1/2 | 4-way |

TABLE 2-continued

| SRAM Relative Size | Cache Relative Size | Cache Associativity |
|---|---|---|
| 3/4 | 1/4 | 4-way |
| 7/8 | 1/8 | 4-way |
| 1 | 0 | — |

Thus: if 0 sets are configured as SRAM, then there are 8 sets of cache 203; if 4 sets 231 are configured as SRAM, then there are four sets of cache 221; if 6 sets 233 are configured as SRAM, then there are two sets of cache 243; if seven sets 235 are configured as SRAM, then there is one set of cache 245; and if 8 sets 237 are configured as SRAM, then there is no cache memory. In the preferred embodiment, the sets may only be configured as SRAM only in a predetermined order enabling the SRAM memory addresses to be contiguous whatever number of sets are configured as SRAM. This technique does not yield the same amount of partition flexibility as the first technique. However, the number of ways of the cache is unchanged. Thus the cache performance will vary only with the amount of memory allocated to cache and not with the number of ways.

Figure 6:
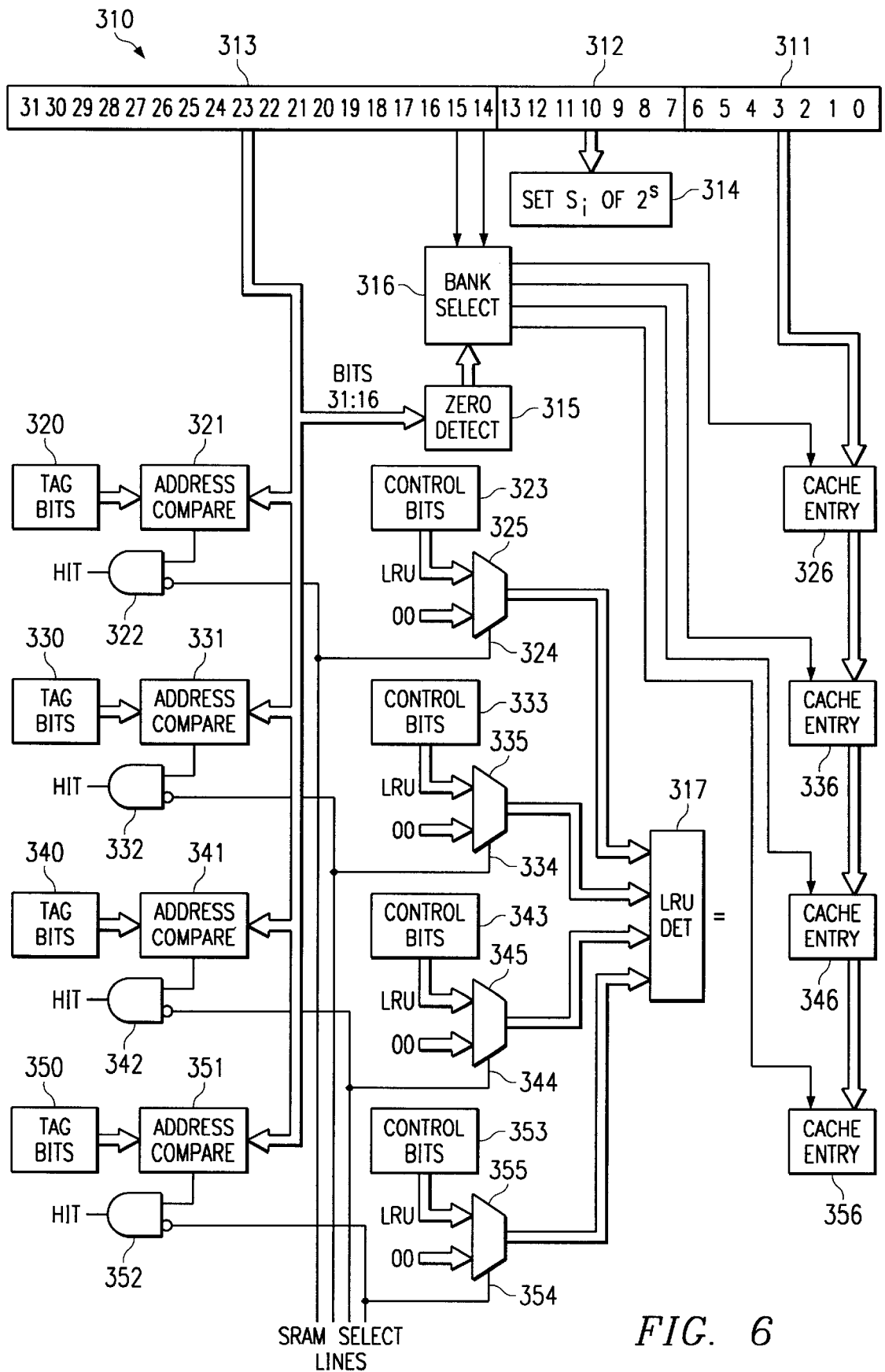
FIG. 6 illustrates the manner of selectively dividing the memory between cache and directly addressable memory in accordance with the preferred embodiment of this invention.

FIG. 6 illustrates the manner of controlling the selection of cache or directly addressable memory in the preferred embodiment of this invention. FIG. 6 illustrates some parts of one set of level two unified cache 130. In the preferred embodiment level two unified cache 130 is a 64 Kbyte memory having 128 sets of 4 ways each and a cache entry size of 128 bytes. Thus the circuits illustrated in FIG. 6 are replicated 128 times within level two unified cache 130.

Each set, such as set $S_i$ 314 illustrated in FIG. 6, includes four cache entries 326, 336, 346 and 356. Each cache entry has a corresponding set of address tag bits and control bits. In FIG. 6: address tag bits 320 and control bits 323 correspond to cache entry 326; address tag bits 330 and control bits 333 correspond to cache entry 336; address tag bits 340 and control bits 343 correspond to cache entry 346; and address tag bits 350 and control bits 353 correspond to cache entry 356.

FIG. 6 illustrates a 32 bit address 310 divided into three parts, least significant bits 311, middle bits 312 and most significant bits 323. In accordance with one convention known in the art, each address uniquely specifies a byte (8 bits) within the memory space. In the preferred embodiment there are 128 bytes within each cache entry 326, 336, 346 and 356, thus least significant bits 311 (6:0) specify one byte of 128 positioned with each cache entry. In the preferred embodiment there are 128 sets 314, thus middle bits 312 (13:7) specify the particular set within the 128 sets. When level two unified cache 130 is configured as all cache, address 310 is parsed as follows. Middle bits 312 are decoded to select one of the 128 sets such as set $S_i$ 314 illustrated in FIG. 6. This selection is typically made via a 1-of-128 decoder (not shown). Thus middle bits 312 point to a particular set such as set $S_i$ 314 illustrated in FIG. 6. Each of the address tag bits 320, 330, 340 and 350 have a corresponding address compare circuit 321, 331, 341 and 351. The address compare circuits 321, 331, 341 and 351 compare the most significant bits 313 of address 310 with the corresponding address tag bits 320, 330, 340 and 350. As known in the art, address tag bits 320, 330, 340 and 350 are loaded with the most significant bits of the address of the data cached in the corresponding cache entries 326, 336, 346 and 356. If one of the address compare circuits 321, 331, 341 or 351 finds a match, this indicates a cache hit. Note that when configured as all cache, SRAM select lines 324, 334, 344 and 354 are all 0. Supply of this 0 to the inverting input causes respective AND gates 322, 332, 342 and 352 to pass the match signal and indicate the cache hit. The data corresponding to the address to be accessed is stored in the corresponding cache entry 326, 336, 346 or 356. Level two unified cache 130 then enables access to data stored in the corresponding cache entry 326, 336, 346 or 356. The data position within the cache entry 326, 336, 346 or 356 corresponds uniquely to the least significant bits of the address. Thus central processing unit 110 can access the date for read or write without requiring data transfer to or from the main memory. If no address compare circuit 321, 331, 341 or 351 finds a match, this indicates a cache miss. This cache miss is serviced in a In the preferred embodiment, level two unified cache 130 may be configured as directly addressable memory on the basis of cache ways. Consider the example of one cache way of four configured as directly addressable memory. The SRAM select line 324 is 1 and SRAM select lines 334, 344 and 354 are 0. Thus AND gates 332, 342 and 352 are enabled to pass a match signal indicating a cache hit from respective address compare circuits 331, 341 and 351. In contrast, AND gate 322 is blocked from passing the match signal from address compare circuit 320 indicating a cache hit due to the 1 on its inverting input. Accordingly, cache entry 326 is never accessed as cache because the corresponding address tag bits 320 can never generate a cache hit signal.

At the same time zero detect circuit 315 and bank select circuit 316 may enable selection of cache entry 326. Assuming middle bits 312 select set Si 314 illustrated in FIG. 6, then bits 14 and 15 enable access to cache entry 326 if they are 00 and bits 16 to 31 are all 0. Zero detect circuit 315 receives address bits 16 to 31 and indicates whether these bits are all 0. Note that the predetermined addresses assigned to the SRAM configured portion of level two unified cache 130 has these bits all 0. If this is the case, bank select circuit 316 is enabled. In this example bank select circuit 316 enables cache entry 326. Then least significant bits 311 point to one byte of the 128 bytes within cache entry 326. Thus the address selects a physical location within level two cache 130 corresponding to the received address.

In the event that two or more ways are configured as cache, bank select circuit 316 controls selection of one of cache entries 326, 336, 346 or 356 corresponding to the state of address bits 14 and 15. Table 3 shows the operation of bank select circuit 316 for all cases.

TABLE 3

| Bits 14:15 | Number of Ways Configured as SRAM | Cache Entry 326 | Cache Entry 335 | Cache Entry 346 | Cache Entry 356 |
|---|---|---|---|---|---|
| XX | 0 | — | — | — | — |
| 00 | 1 | Select | — | — | — |
| 01 | 1 | — | — | — | — |
| 10 | 1 | — | — | — | — |
| 11 | 1 | — | — | — | — |
| 00 | 2 | Select | — | — | — |
| 01 | 2 | — | Select | — | — |
| 10 | 2 | — | — | — | — |
| 11 | 2 | — | — | — | — |
| 00 | 3 | Select | — | — | — |
| 01 | 3 | — | Select | — | — |
| 10 | 3 | — | — | Select | — |
| 11 | 3 | — | — | — | — |
| 00 | 4 | Select | — | — | — |
| 01 | 4 | — | Select | — | — |

TABLE 3-continued

| Bits 14:15 | Number of Ways Configured as SRAM | Cache Entry 326 | Cache Entry 335 | Cache Entry 346 | Cache Entry 356 |
|---|---|---|---|---|---|
| 10 | 4 | — | — | Select | — |
| 11 | 4 | — | — | — | Select |

If no directly addressable memory is selected, then bank select circuit 316 never enables any cache entry. Thus bits 14 and 15 are a don't care condition XX. If one cache way is configured as directly addressable memory, then cache entry 326 is enabled only if address bits 14 and 15 are 00 as described above. If address bits 14 and 15 are not both 0, then the address is beyond the range of the SRAM configured portion of level two unified cache 130. If two cache ways are configured as directly addressable memory, then cache entry 326 is enabled if address bits 14 and 15 are 00, cache entry 336 is enabled if address bits 14 and 15 are 01, otherwise no cache entry is enabled. With three cache ways configured as directly addressable memory, cache entry 326 is enabled if address bits 14 and 15 are 00, cache entry 336 is enabled if address bits 14 and 15 are 01, cache entry 346 is enabled if address bits 14 and 15 are 10 and no cache entry is enabled if address bits 14 and 15 are 11. Lastly, if the whole of level two unified cache 130 is configured as directly addressable memory, then cache entry 326 is enabled if address bits 14 and 15 are 00, cache entry 336 is enabled if address bits 14 and 15 are 01, cache entry 346 is enabled if address bits 14 and 15 are 10 and cache entry 356 is enabled if address bits 14 and 15 are 11. Thus bank select circuit 316 selects the cache entry 326, 336, 346 or 356 or no cache entry depending on the amount of directly addressable memory specified and the address. The result is that the address specifies a physical location within the directly addressable memory configured portion of level two unified cache 130.

Figure 7:
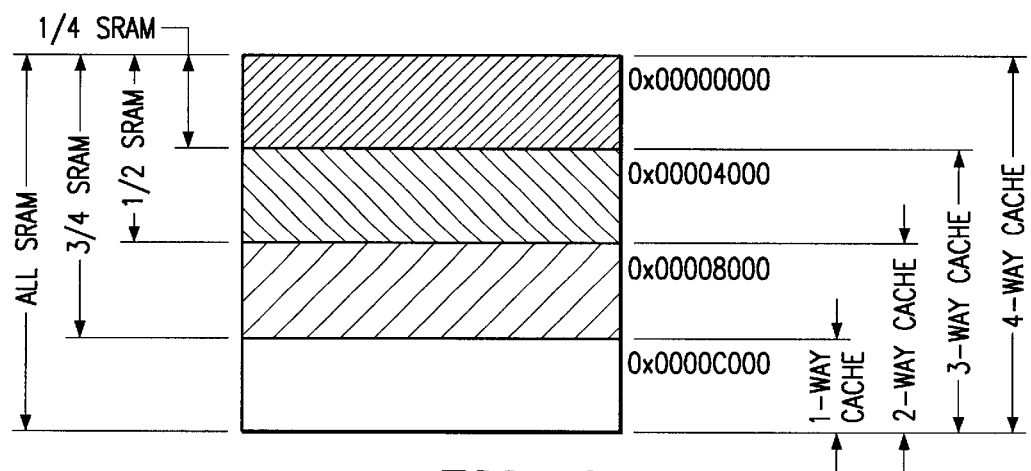
FIG. 7 illustrates the addresses assigned to the directly addressable memory portion of the memory in the preferred embodiment of this invention.

As shown in FIG. 7, the portions of level two unified cache 130 partitioned as directly addressable memory have predetermined addresses. Digital signal processor system 100 preferably employs a 32 bit address. FIG. 7 shows the addresses assigned to the directly addressable memory configured portions of level two unified cache 130 in hexadecimal. The first quarter starts at Hexadecimal 00000000. When one quarter of level two unified cache 130 is configured as SRAM, this memory occupies addresses between Hex 00000000 and Hex 00003FFF. The second quarter starts at Hexadecimal 000040000. When half of level two unified cache 130 is configured as SPAM, this memory occupies addressed between Hex 00000000 and Hex 00007FFF. The third quarter starts at Hexadecimal 000080000. When three quarters of level two unified cache 130 is configured as SRAM, this memory occupies addresses between Hex 00000000 and Hex 0000BFFF. The final quarter starts at Hexadecimal 0000C0000. When all of level two unified cache 130 is configured as SRAM, this memory occupies addresses between Hex 00000000 and Hex 0000FFFF. Read accesses to addresses within these ranges when configured as cache will return invalid data. Write accesses to addresses within these ranges when configured as cache will be discarded and not change the data stored in level two unified cache 130.

FIG. 6 further illustrates a manner to prevent eviction of a cache entry that is configured as directly addressable memory. Each cache entry 326, 336, 346 and 356 has a corresponding set of control bits 323, 333, 343 and 353. These control bits are known in the art. They typically include an indication of whether the cache entry is valid or invalid, whether the cache entry is clean (not modified) or dirty (modified) and some indication of the least recently used entry. It is typical in the art to replace the least recently used cache entry within the way when replacement is necessary. Upon a cache miss requiring victim eviction, the victim must be from the same set as the set which may store the missed address. It is typical to retain information regarding recent accesses to the cache entries and evict the least recently used cache entry. The preferred embodiment of this invention prevents eviction of a cache entry configured as directly addressable memory. Consider cache entry 326 when at least some of level two unified memory 130 is configured as directly addressable memory. In that event SRAM select line 324 is 1 as previously described. Multiplexer circuit 325 receives least recently used (LRU) bits from control bits 323 indicative of the least recently used state of cache entry 326 at one input. The other input receives a constant 00, which does not indicate a least recently used condition. With SRAM select line 324 as 1, multiplexer selects the constant input. Even if cache entry 326 was the least recently used among the cache entries 326, 336, 346 and 356 of the set 316, the substitution of the constant at multiplexer 325 prevents least recently used detect circuit 319 from indicating this. Instead least recently used circuit indicates another of the cache entries 336, 346 or 356 is selected as the least recently used entry. Thus another cache entry is replaced upon a cache miss to this set 314.

FIG. 6 illustrates a similar multiplexer 335, 345 and 355 for cache entries 336, 346 and 356, respectively. When the corresponding SRAM select line 334, 344 or 354 is 1, indicating that the corresponding cache entry 336, 346 or 356 is configured as directly addressed memory, the corresponding multiplexer 335, 345 and 355 selects the constant input. Consequently least recently used detector 317 cannot indicate that cache entry was the least recently used.

The result of the operation of the circuits illustrated in FIG. 6 is as follows. No cache entry configured as directly addressable memory can cause a cache hit or be detected as the least recently used cache entry of the set for cache entry eviction. If the memory address is within the range of addresses of the directly addressable memory, then the circuits enable bank selection of the addressed cache entry. Those skilled in the art would realize that other circuits could achieve these results. For example, rather than block or enable a bit signal produced by an address compare circuit, it is feasible to disable the address compare circuit. This would also achieve the desired result of preventing generation of a hit signal corresponding to a cache entry configured as directly addressable memory. As a further alternative, zero detect circuit 315, bank select circuit 316 and AND gates 322, 332, 342 and 352 could be eliminated. Instead, tag bits 320, 330, 340 and 350 would be loaded with bits corresponding to the directly addressable memory address. If one way were configured as cache, then tag bits 320 for each set would be loaded with all 0. When the address is within the address range Hex 00000000 and Hex 00003FFF assigned to directly addressable memory in this case, then the normal cache mechanism would generate a cache hit to cache entry 326 of the corresponding set 314. If two ways were configured as directly addressable memory, then tag bits 320 would be set as all 0 and tag bits 330 would be set with bit 14 as 1 and bits 15 to 31 as zero. An address within the address range Hex 00000000 and Hex 00003FFF would generate a cache hit to cache entry 326 of the corresponding set 314 and an address within the range Hex 000040000 to Hex 00007FFF would generate a cache hit to entry 336 of the corresponding set 314. Similar tag bits would enable other combinations of configuration as shown in Table 4.

TABLE 4

| Number of Ways Configured as SRAM | Tag Bits 320 (15:14) | Tag Bits 330 (15:14) | Tag Bits 340 (15:14) | Tag Bits 350 (15:14) |
|---|---|---|---|---|
| 0 | — | — | — | — |
| 1 | 00 | — | — | — |
| 2 | 00 | 01 | — | — |
| 3 | 00 | 01 | 10 | — |
| 4 | 00 | 01 | 10 | 11 |

A mechanism to prevent eviction of a cache entry configured as directly addressable memory would still be required. This could take the form of the least recently used multiplexers 325, 335, 345 and 355 as described above and illustrated in FIG. 6.

FIG. 6 illustrates circuits for the preferred embodiment where memory is configured as cache or directly addressable memory on the basis of cache ways. Those skilled in the art would realize that similar circuits could be used to embody the alternate in which memory is configured on the basis of sets. Bank select circuit 316 would need to be responsive to address bits within middle bits 312 to select the set configured as directly addressable memory and make the appropriate bank selection. The AND gates 322, 332, 342 and 352 would be controlled on the basis of sets rather than on the basis of ways as illustrated in FIG. 6. Thus only a single SRAM select line would be required for each set. This SRAM select line would block indication of a cache hit based upon the sets configured as directly addressable memory. A similar mechanism would block determination that the corresponding cache entry was the least recently used. Other portions of FIG. 6 would be unchanged.

Figure 8:
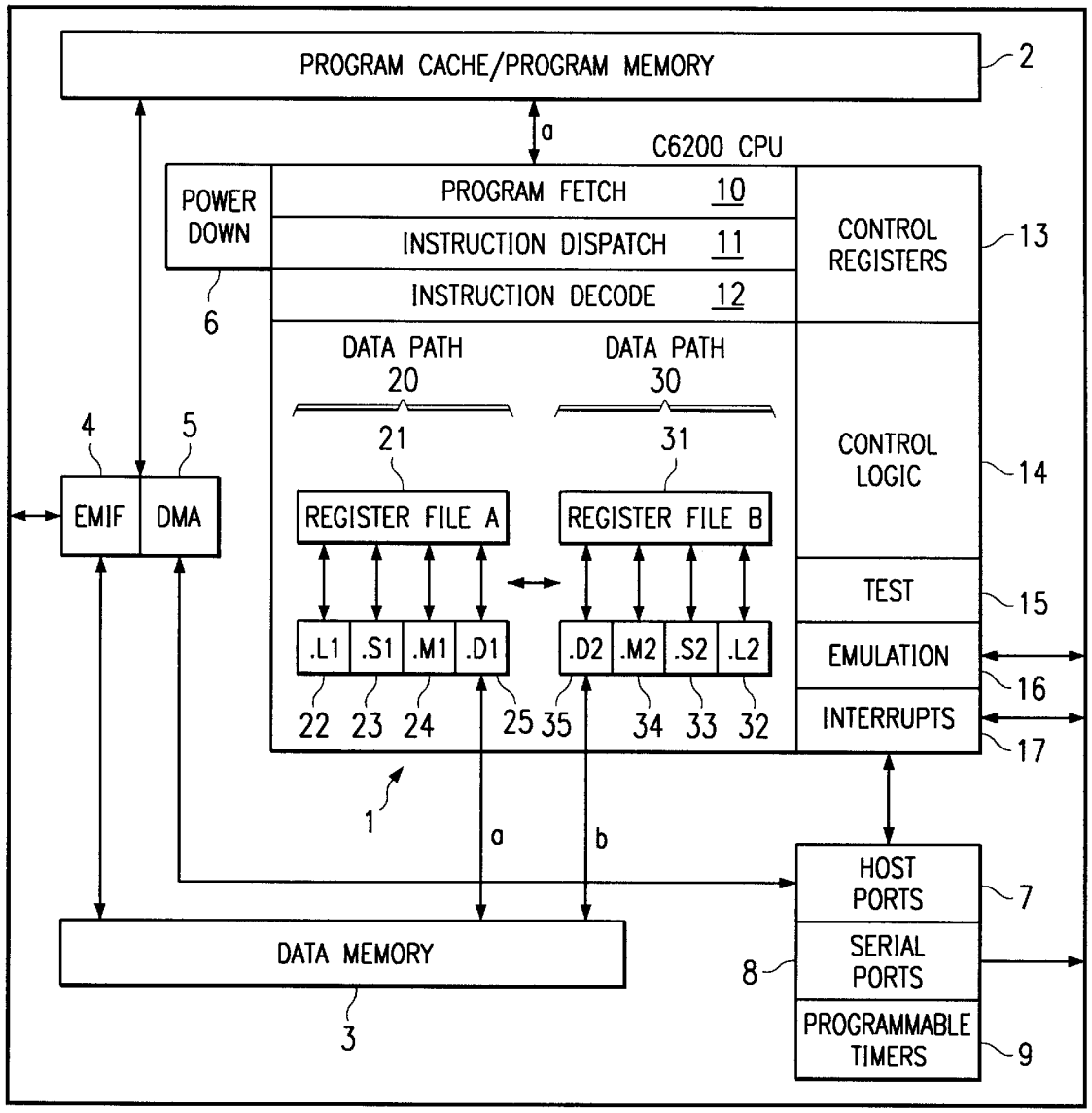
FIG. 8 illustrates details of a very long instruction word digital signal processor core suitable for use in FIG. 1.

FIG. 8 is a block diagram illustrating details of a digital signal processor core suitable for this invention. The digital signal processor core of FIG. 8 is a 32-bit eight-way VLIW pipelined processor. The digital signal processor includes central processing unit 1, shown in the right center portion of FIG. 8. The digital signal processor includes program memory 2 which may optionally be used as a program cache. The digital signal processor may also have varying sizes and types of data memory 3. The digital signal processor also includes peripherals 4 to 9. These peripherals preferably include an external memory interface (EMIF) 4 and a direct memory access (DMA) controller 5. External memory interface (EMIF) 4 preferably supports access to supports synchronous and a synchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

The digital signal processor core has a 32-bit, byte addressable address space. Internal memory on the same integrated circuit is preferably organized in a data space including data memory 3 and a program space including program memory 2. When off-chip memory is used, preferably these two spaces are unified into a single memory space via the external memory interface (EMIF) 4.

Program memory 3 may be internally accessed by central processing unit 1 via two internal ports 3a and 3b. Each internal port 3a and 3b preferably has 32 bits of data and a 32-bit byte address reach. Program memory 2 may be internally accessed by central processing unit 1 via a single port 2a. Port 2a of program memory 2 preferably has an instruction-fetch width of 256 bits and a 30-bit word (four bytes) address, equivalent to a 32-bit byte address. Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit registers forming register file 21. Second data path 30 likewise includes four functional units designated L2 unit 32, S2 unit 33, M2 unit 34 and D2 unit 35 and 16 32-bit registers forming register file 31. Central processing unit 1 includes control registers 13, control logic 14, and test logic 15, emulation logic 16 and interrupt logic 17.

Program fetch unit 10, instruction dispatch unit 11 and instruction decode 12 unit recall instructions from program memory 2 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 9A:
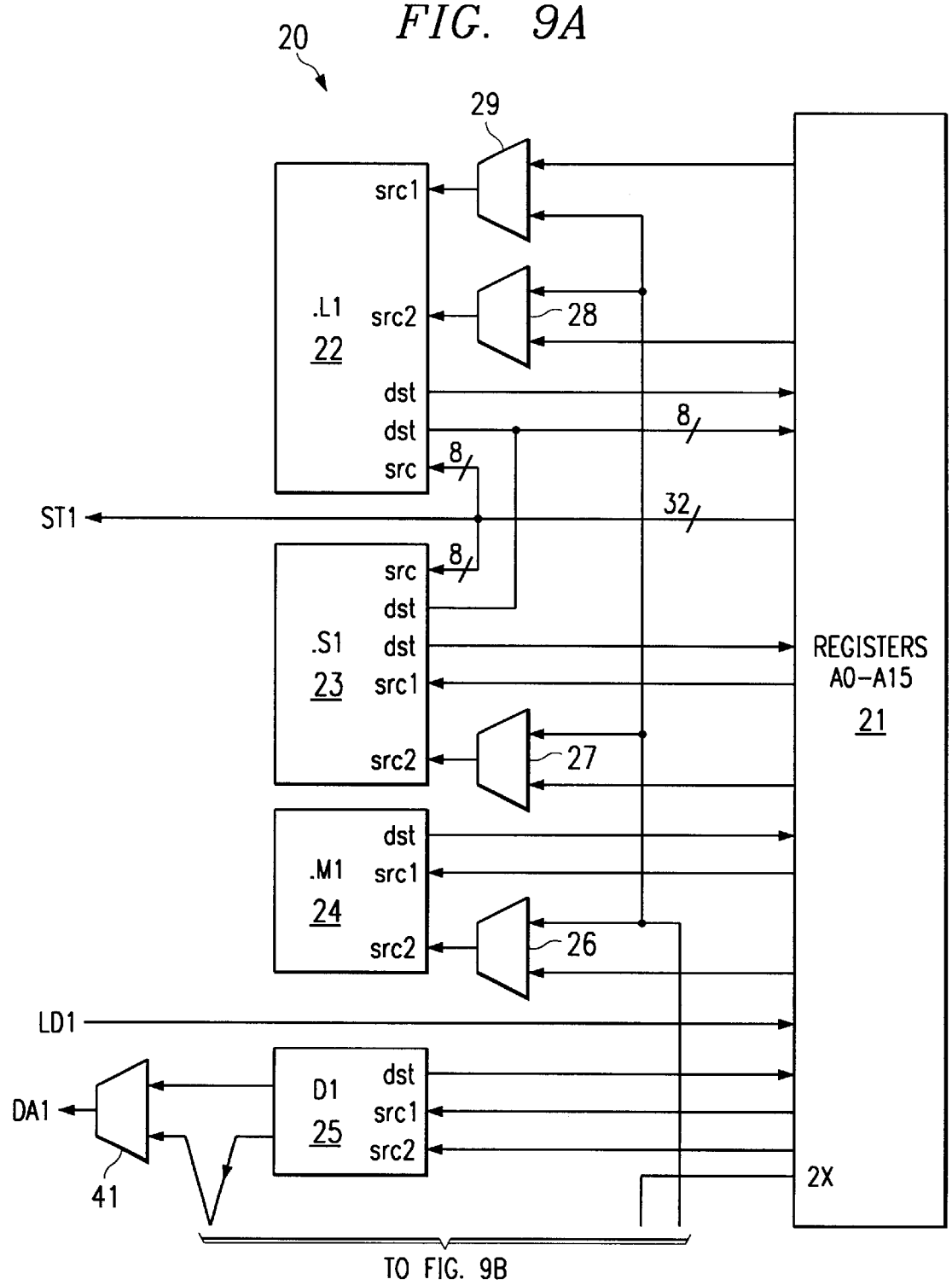
FIGS. 9A and 9B together illustrate additional details of the digital signal processor of FIG. 8.
Figure 9B:
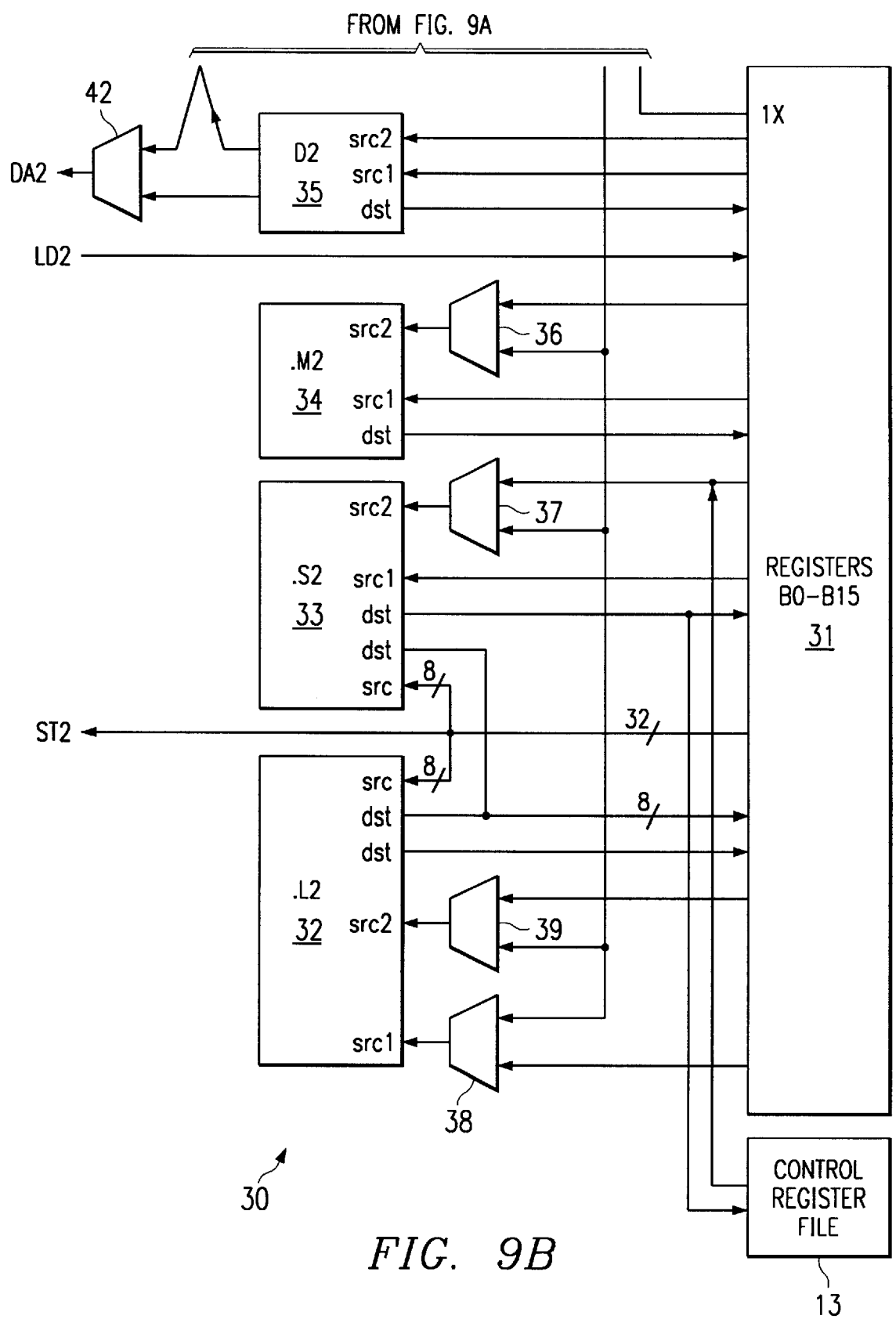

FIGS. 9A and 9B together illustrate the data paths of central processing unit 1. There are two general purpose register files 21 and 31. Each of general purpose register files 21 and 31 include 16 32-bit registers. These registers are designated registers A0 to A15 for register file 21 and registers B0 to B15 for register file 31. These general purpose registers can be used for data, data address pointers or as condition registers.

There are eight functional units L1 unit 22, L2 unit 32, S1 unit 23, S2 unit 33, M1 unit 24, M2 unit 34, D1 unit 25 and D2 unit 35. These eight functional units can be divided into two virtually identical groups of 4 (22 to 25 and 32 to 35) coupled to a corresponding register file. There are four types of functional units designated L, S, M and D. Table 5 lists the functional capabilities of these four types of functional units.

TABLE 5

| Functional Unit | Description |
|---|---|
| L Unit (L1, L2) | 32/40-bit arithmetic and compare operations<br>Left most 1, 0, bit counting for 32 bits<br>Normalization count for 32 and 40 bits<br>32 bit logical operations |
| S Unit (S1, S2) | 32-bit arithmetic and bit-field operations<br>32/40 bit shifts<br>32 bit logical operations<br>Branching<br>Constant generation<br>Register transfers to/from control register file |
| M Unit (M1, M2) | 16 × 16 bit multiplies |
| D Unit (D1, D2) | 32-bit add, subtract, linear and circular address calculation |

Most data lines within central processing unit 1 support 32-bit operands. Some data lines support long (40-bit) operands. Each functional unit has its own 32-bit write port into the corresponding general-purpose register file. Functional units L1 unit 22, Si unit 23, Ml unit 24 and D1 unit 25 write to register file 21. Functional units L2 unit 32, S2 unit 33, M2 unit 34 and D2 unit 35 write to register file 31. As depicted in FIG. 9, each functional unit has two 32-bit read ports for respective source operands src1 and src2 from the corresponding register file. The four functional units L1 unit 22, L2 unit 32, Si unit 23 and S2 unit 33 have an extra 8-bit wide write port for 40-bit long writes as well as an extra 8-bit wide read port for 40-bit long reads. Because each functional unit has its own 32-bit write port, all eight functional units can be used in parallel every cycle.

FIG. 9A and 9B together illustrate cross register paths 1X and 2X. Function units L1 unit 22, S1 unit 23 and M1 unit 24 may receive one operand from register file 31 via cross register path 1x. Function units L2 unit 32, S2 unit 33 and M2 unit 34 may receive one operand from register file 21 via cross register path 2X. These paths allow the S, M and L units from each data path to access operands from either register file 21 or 31. Four functional units, M1 unit 24, M2 unit 34, S1 unit 23 and S2 unit 33, have one 32-bit input multiplexer which may select either the same side register file or the opposite file via the respective cross path 1X or 2X. Multiplexer 26 supplies an operand from either register file 21 or register file 31 to the second source input src2 of M unit 24. Multiplexer 36 supplies an operand from either register file 21 or register file 31 to the second source input src2 of M unit 34. Multiplexer 27 supplies an operand from either register file 21 or register file 31 to the second source input src2 of S unit 23. Multiplexer 37 supplies an operand from either register file 21 or register file 31 to the second source input src2 of S unit 33. Both the 32-bit inputs of function units L1 unit 22 and L2 unit 32 include multiplexers which may select either the corresponding register file or the corresponding cross path. Multiplexer 28 supplies the first source input src1 of L unit 22 and multiplexer 29 supplies the second source input src2. Multiplexer 38 supplies the first source input src1 of L unit 32 and multiplexer 39 supplies the second source input src2.

There are two 32-bit paths for loading data from memory to the register file. Data path LD1 enables loading register file A and data path LD2 enables loading register file B. There are also two 32-bit paths for storing register values to memory from the register file. Data path ST1 enables storing data from register file A to memory and data path ST2 enables storing data from register file B to memory. These store paths ST1 and ST2 are shared with the L unit and S unit long read paths.

FIGS. 9A and 9B together illustrate two data address paths (DA1 and DA2) coming from respective D units 25 and 35. These data address paths allow supply of data addresses generated by the D units to specify memory address. D unit 25 and D unit 35 each supply one input to address multiplexers 41 and 42. Address multiplexers 41 and 42 permit D unit 25 to support loads from memory to either register file 21 or register file 31 and to support stores from either register file 21 or register file 31 to memory. Address multiplexers 41 and 42 likewise permit D unit 35 to support loads and stores involving either register file 21 or register file 31.

FIG. 9B illustrates data paths enabling S2 unit 33 to read from and to write to the control register file 13.

What is claimed is:

1. A data processing apparatus comprising:
   a central processing unit for executing instructions manipulating data; and
   a memory connected to said central processing unit, configured as a predetermined number of cache entries organized in a predetermined number of $2^N$ sets serving as proxy for N address bits and a predetermined number of ways for each set and selectively configurable as cache memory and directly addressable memory by configuring a selected number of ways as directly addressable memory and configuring remaining ways as cache memory, said memory including
   tag bits for each cache entry,
   an address comparator for each cache entry having a first input connected to said corresponding tag bits and a second input receiving an address to which access is sought, said address comparator indicating whether said tag bits matches a predetermined number of most significant bits of said address, and
   control logic coupled to said address comparator for inhibiting indication that said tag bits matches said predetermined number of address bits if said corresponding way is configured as directly addressable memory.

2. The data processing apparatus of claim 1, wherein:
   said control logic includes an AND gate having a first input receiving said indication of whether said tag bits matches said predetermined number of address bits and a second input receiving a signal indicating whether said corresponding way is configured as directly addressable memory for inhibiting generation of a match signal if said corresponding way is configured as directly addressable memory and an output.

3. The data processing apparatus of claim 1, further comprising:
   control bits corresponding to each cache entry storing an indication of a least recently used state of said cache entry;
   a least recently used detector for each set connected to said control bits for each cache entry within each set determining the least recently used cache entry within said set for cache eviction; and
   said control logic inhibiting indication that a cache entry is the least recently used for cache eviction if said corresponding way is configured as directly addressable memory.

4. The data processing apparatus of claim 1, wherein:
   said control logic includes a bank select circuit enabling one cache way matching an address to be accessed dependent upon a predetermined at least one address bit and the particular ways configured as directly addressable memory.

5. The data processing apparatus of claim 1, wherein:
   said control logic loads said tag bits corresponding to cache entries configured as directly addressable memory with an address equal to a predetermined address assigned to directly addressable memory for said cache entry.

6. A data processing apparatus comprising:
   a central processing unit for executing instructions manipulating data; and
   a memory connected to said central processing unit, configured as a predetermined number of cache entries organized in a predetermined number of $2^N$ sets serving as proxy for N address bits and a predetermined number of ways for each set and selectively configurable as cache memory and directly addressable memory by configuring a selected number of sets equal to $2^M$, where M is an integer, as cache memory and configuring remaining sets as directly addressable memory.

7. A memory subsystem comprising:

a data array including a plurality of cache entries for storing data, said data array configured as a predetermined number of cache entries organized in a predetermined number of $2^N$ sets serving as proxy for N address bits and a predetermined number of ways for each set;

a tag array storing a plurality of bits for each of said cache entries;

an address comparator for each cache entry having a first input connected to said corresponding tag bits and a second input receiving an address to which access is sought, said address comparator indicating whether said tag bits matches a predetermined number of most significant bits of said address, and control logic coupled to said data array and said tag array for selectively configuring at least part of memory as directly addressable memory, and coupled to said address comparator for inhibiting indication that said tag bits matches said predetermined number of address bits if said corresponding way is configured as directly addressable memory.

8. The memory subsystem of claim 7, wherein:

said control logic includes an AND gate having a first input receiving said indication of whether said tag bits matches said predetermined number of address bits and a second input receiving a signal indicating whether said corresponding way is configured as directly addressable memory for inhibiting generation of a match signal if said corresponding way is configured as directly addressable memory and an output.

9. The memory subsystem of claim 7, further comprising:

control bits corresponding to each cache entry storing an indication of a least recently used state of said cache entry;

a least recently used detector for each set connected to said control bits for each cache entry within each set determining the least recently used cache entry within said set for cache eviction; and said control logic inhibiting indication that a cache entry is the least recently used for cache eviction if said corresponding way is configured as directly addressable memory.

10. The memory subsystem of claim 7, wherein:

said control logic includes a bank select circuit enabling one cache way matching an address to be accessed dependent upon a predetermined at least one address bit and the particular ways configured as directly addressable memory.

11. The memory subsystem of claim 7, wherein:

said control logic loads said tag bits corresponding to cache entries configured as directly addressable memory with an address equal to a predetermined address assigned to directly addressable memory for said cache entry.

12. A memory subsystem comprising:

a data array including a plurality of cache entries for storing data, said data array configured as a predetermined number of cache entries organized in a predetermined number of $2^N$ sets serving as proxy for N address bits and a predetermined number of ways for each set;

a tag array storing a plurality of bits for each of said cache entries; and control logic coupled to said data array and said tag array for selectively configuring at least part of memory as directly addressable memory by configuring a selected number of sets equal to $2^M$, where M is an integer, as cache memory and configuring remaining sets as directly addressable memory.

13. The data processing apparatus of claim 1, wherein:

said cache ways configured as directly addressable memory are accessed at predetermined addresses.

14. The data processing apparatus of claim 13, wherein:

said predetermined addresses of said cache ways when configured as directly addressable memory are contiguous; and said cache ways are configured as directly addressable memory in an order such that addresses of all cache ways currently configured as directly addressable memory are contiguous.

15. The data processing apparatus of claim 14, wherein:

said predetermined addresses of said cache way having the lowest predetermined addresses when configured as directly addressable memory include a lowest possible memory address.

16. The data processing apparatus of claim 13, wherein:

attempted access to said predetermined addresses of a cache way configured as cache memory are invalid.

17. The memory subsystem of claim 7, wherein:

said cache ways configured as directly addressable memory are accessed at predetermined addresses.

18. The memory subsystem of claim 17, wherein:

said predetermined addresses of said cache ways when configured as directly addressable memory are contiguous; and said cache ways are configured as directly addressable memory in an order such that addresses of all cache ways currently configured as directly addressable memory are contiguous.

19. The memory subsystem of claim 18, wherein:

said predetermined addresses of said cache way having the lowest predetermined addresses when configured as directly addressable memory includes a lowest possible memory address.

20. The memory subsystem of claim 17, wherein:

attempted access to said predetermined addresses of a cache way configured as cache memory are invalid.

\* \* \* \* \*